United States Patent
Rohde et al.

(10) Patent No.: US 8,617,344 B2
(45) Date of Patent: Dec. 31, 2013

(54) MULTISTAGE PROCESS FOR PRODUCING HOLLOW PLASTIC ARTICLES FROM HALF SHELLS

(71) Applicant: Basell Polyolefine GmbH, Wesseling (DE)

(72) Inventors: Wolfgang Rohde, Speyer (DE); Jörg Meyer, Dannstadt-Schauernheim (DE); Rainer Sattel, Waldsee (DE); Jörg Schnorr, Ludwigshafen (DE); Bernhard Springholz, Malsch (DE); Roger Weinlein, Frankfurt (DE); Andreas Wüst, Zwingenberg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 13/631,610

(22) Filed: Sep. 28, 2012

(65) Prior Publication Data
US 2013/0025778 A1  Jan. 31, 2013

Related U.S. Application Data

(63) Continuation of application No. 10/520,536, filed as application No. PCT/EP03/07353 on Jul. 9, 2003, now abandoned.

(60) Provisional application No. 60/416,990, filed on Oct. 8, 2002.

(30) Foreign Application Priority Data

Jul. 12, 2002   (EP) .................................... 10231866

(51) Int. Cl.
*B32B 37/00* (2006.01)

(52) U.S. Cl.
USPC ..................... 156/308.2; 156/245; 156/309.6; 156/292; 156/244.24

(58) Field of Classification Search
USPC ........... 156/245, 308.2, 309.6, 309.9, 244.11, 156/244.13, 244.18, 244.22, 244.24, 196, 156/292, 308.4; 264/146, 147, 152, 510, 264/515, 516, 523, 544, 545
See application file for complete search history.

(56) References Cited

U.S. PATENT DOCUMENTS 3,103,409 A  *  9/1963  Bohres et al. ............... 264/209.7
3,779,475 A  *  12/1973  Plevin ......................... 242/530.4

(Continued)

FOREIGN PATENT DOCUMENTS

DE   19814314   10/1999
DE   10010900   9/2001

(Continued)

OTHER PUBLICATIONS

Decision on Appeal, Appeal No. 2100-007280; U.S. Appl. No. 10/520,536; Technology Center 1700, BPAI of the USPTO, dated Jul. 31, 2012.

*Primary Examiner* — John Goff

(57) ABSTRACT

The present invention relates to a multistage process for producing hollow plastic articles, encompassing the following steps:
a) producing a tubular plastic parison by means of extrusion or coextrusion;
b) cutting open the plastic parison to produce two planar-surface parts;
c) molding the planar-surface parts in two mold halves to give half shells, where a removable intermediate frame separates the mold halves from one another at least along the peripheral edges, so that the semifinished products/half shells are not in contact with one another;
d) opening the mold halves and removing the intermediate frame;
e) closing the mold halves, with the result that the half shells come into contact with one another along a peripheral rim; and
f) bonding the half shells to give a hollow article.

22 Claims, 4 Drawing Sheets

(56) References Cited

U.S. PATENT DOCUMENTS

| | | | |
|---|---|---|---|
| 3,849,286 A * | 11/1974 | Brandt et al. | 250/325 |
| 4,022,559 A | 5/1977 | Nielson | |
| 4,028,034 A | 6/1977 | Hahn | |
| 4,170,449 A | 10/1979 | Shuman | |
| 4,550,008 A | 10/1985 | Shimizu | |
| 4,885,895 A | 12/1989 | Focke et al. | |
| 5,475,461 A * | 12/1995 | Fyson et al. | 396/616 |
| 6,294,114 B1 | 9/2001 | Muirhead | |
| 6,661,339 B2 | 12/2003 | Muirhead | |
| 6,749,418 B2 | 6/2004 | Muirhead et al. | |
| 6,893,603 B2 | 5/2005 | Rohde et al. | |
| 2001/0015513 A1 | 8/2001 | Schaftingen et al. | |
| 2002/0024171 A1 * | 2/2002 | Rohde et al. | 264/515 |
| 2002/0105115 A1 | 8/2002 | Sadr | |
| 2003/0090024 A1 | 5/2003 | Skov et al. | |
| 2006/0099290 A1 | 5/2006 | Rohde et al. | |

FOREIGN PATENT DOCUMENTS

| | | |
|---|---|---|
| DE | 10042121 | 3/2002 |
| EP | 0653286 | 5/1995 |
| EP | 1184157 | 3/2002 |
| FR | 2420415 | 10/1979 |
| GB | 1410215 | 10/1975 |
| JP | 61261021 | 7/1986 |
| JP | 6218792 | 8/1994 |
| JP | 2000 218684 | 8/2000 |
| WO | WO-2004/007183 | 1/2004 |

* cited by examiner

MULTISTAGE PROCESS FOR PRODUCING HOLLOW PLASTIC ARTICLES FROM HALF SHELLS

CROSS-REFERENCE TO RELATED APPLICATIONS

This application is a continuation of application Ser. No. 10/520,536, filed Oct. 14, 2005, now abandoned which is the U.S. national phase of International Application PCT/EP2003/007353, filed Jul. 9, 2003, claiming priority to German Patent Application 10231866.2 filed Jul. 12, 2002, and the benefit under 35 U.S.C. 119(e) of U.S. Provisional Application No. 60/416,990, filed Oct. 8, 2002; the disclosures of application Ser. No. 10/520,536, International Application PCT/EP2003/007353, German Patent Application 10231866.2 and U.S. Provisional Application No. 60/416,990, each as filed, are incorporated herein by reference.

The present invention relates to a multistage process for producing hollow plastic articles from half shells. The present invention further relates to hollow plastic articles which can be produced by the above-mentioned process, and also to the use of these, for example as plastic fuel tanks in motor vehicles.

Hollow plastic articles in the form of fuel tanks have almost completely replaced tanks made from metallic materials usually used hitherto in motor vehicle construction. Furthermore, portable or movable containers of all types are nowadays produced almost exclusively from plastics, examples being gasoline canisters, plastic bottles, plastic drums, and plastic containers for combustible liquids, hazardous materials, or the like. The particular advantage of plastic containers and tanks is especially their lower weight/volume ratio and the elimination of corrosion problems, and also the low cost of production.

Various processes can be used to produce hollow plastic articles. Besides the process known as rotational sintering, a process especially used for large-scale mass production is blow molding, including coextrusion blow molding.

The existence world wide of legal requirements for the reduction of ozone-forming emissions, such as fuel-related emissions, means that plastic fuel tanks (PFTs) in all vehicles have to prevent discharge of fuels under stationary and operating conditions. If the plastic used to produce a plastic fuel tank does not have inherent barrier properties, additional measures have to be taken to reduce permeation, examples being fluorination (in-line or off-line), painting or coating, plasma polymerization, the use of blends (Selar® process), or coextrusion processes (incorporation of various barrier polymers within a multilayer composite).

In addition to this, in order to fulfil legal requirements relating to the avoidance of fuel emissions from the fuel system it is increasingly necessary to integrate parts within the interior of the tank. The parts, such as lines or valves, may be incorporated prior to or after any coating process required. It is only possible to incorporate parts prior to the coating process if the incorporated parts are not damaged by the coating process. If the coating process takes place prior to incorporation of any parts, the coating is likely to be damaged at attachment points (welds) in the tank.

A process used to construct multilayer hollow articles is the abovementioned coextrusion blow molding process. Blow molding or coextrusion blow molding is a widely used technique but has the disadvantage that it is impossible, or possible only to a very limited extent, to integrate components, e.g. fuel system components, after production of the hollow plastic article.

DE 198 14 314 describes what may be called a melt compression process. In this, a coextruded parison, for example in the form of a tube from a blow molding plant, is placed in a mold and, using a ram or negative mold, pressed to give a half shell. A disadvantage is that prior to the welding process the ram has to be removed from the mold, making it impossible to use the heat for welding. In addition, marked melt-compression flow takes place parallel to the mold surface during pressing, and although this permits successful control of total wall thickness via the geometric dimensions of mold and ram there can be local thinning of the mostly free flowing barrier polymer melt, in turn giving non-uniform barrier action across the hollow plastic article.

Another production process known from the prior art, what may be called the thermoforming process or twin-sheet process, begins by manufacturing two half shells via thermoforming of appropriate semifinished sheets, and welds these to one another in a second step of the process. However, one of the fundamental disadvantages of this process is that the wall thickness distribution in the tank half shells is not fully controllable. The reason for inadequate controllability of the wall thickness distribution and therefore of the barrier layer thickness distribution is that the semifinished sheets have uniform wall thickness and therefore, depending on the stretching ratios during thermoforming, there can be marked local reduction of the wall thickness or barrier layer thickness.

DE 100 42 121 discloses a process for producing hollow plastic articles by first producing a tubular plastic parison on a blow molding or coextrusion blow molding plant and then cutting this open to give at least one planar-surface part, and then thermoforming the resultant planar-surface parts to give half shells and welding them to one another to give a hollow article.

The principle of that process for producing hollow plastic articles is that a plastic parison produced on a blow molding or coextrusion blow molding plant is cut open in an axial direction and the resultant molten planar-surface semifinished sheets are placed in two thermoforming molds and formed to give the desired shape. This method gives two half shells which can then be welded to one another using the heat from thermoforming. This process has disadvantages in that when components are incorporated in the interior of the half shells these progressively cool, the result being that the components subsequently have to be heated prior to welding, and this leads to the development of stresses in the weld which in the finished PFT give rise to notching and points of weakness. The stability of the PFT also depends decisively on the quality of the pinch-off edges on the half shells. Stresses induced within the plastic here likewise have an adverse effect on the mechanical load-bearing capability of the hollow plastic article.

US patent application 2001/0015513 describes another process of the prior art. Here, a single-stage process is used to produce the hollow articles on a two-part blow molding plant via immediate welding and blow molding of two half shells after cutting open of an extruded tubular plastic preform to give two sections. Any incorporated parts here are introduced into the hollow article as it develops simultaneously with the closing of the mold halves by way of a robot. This procedure implies high apparatus costs and control costs.

The above descriptions show that the processes known in the prior art for producing hollow plastic articles have many serious disadvantages.

It is an object of the present invention to meet the urgent need for provision of a process which produces hollow plastic articles and eliminate the above-mentioned disadvantages of the prior art. A further object of the present invention is to develop a process which continues to use the existing coextrusion blow molding plants or blow molding plants widely used in industry. Further objects are apparent from the following description of the invention.

We have found that this object is achieved in relation to the process by the features of claim 1.

Advantageous embodiments of the process of the invention are defined in the process subclaims.

Figure 1:
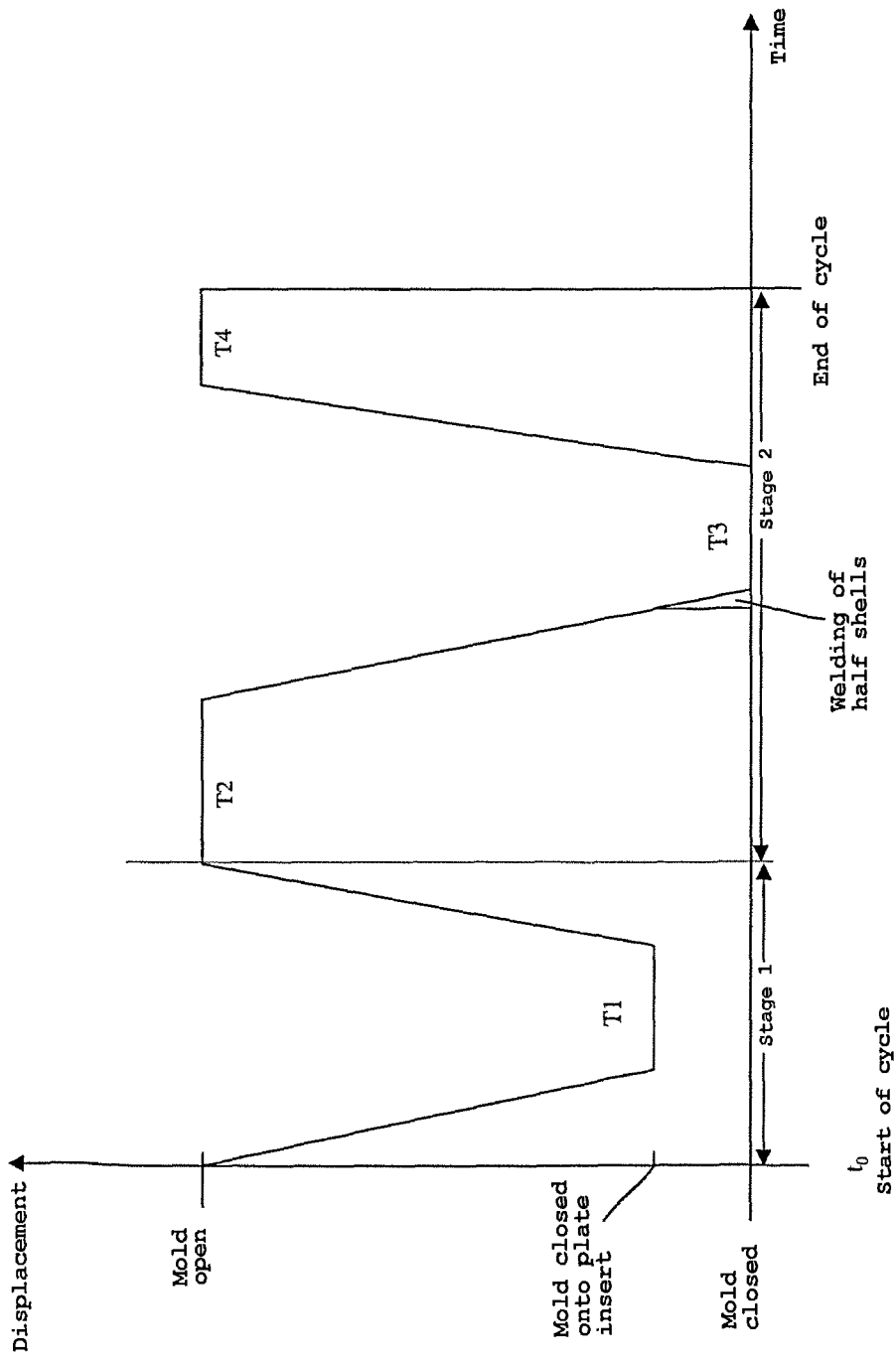
FIG. 1 is a displacement/time diagram for a multistage process for producing hollow plastic articles.

The invention provides a process for producing hollow plastic articles, encompassing the following steps:
a) producing a tubular plastic parison by means of extrusion or coextrusion;
b) cutting open the plastic parison to produce two planar-surface parts;
c) molding the planar-surface parts in two mold halves to give half shells, where a removable intermediate frame separates the mold halves from one another at least along the peripheral edges, so that the semifinished products/half shells are not in contact with one another;
d) opening the mold halves and removing the intermediate frame;
e) closing the mold halves, with the result that the half shells come into contact with one another along a peripheral rim; and
f) bonding the half shells to give a hollow article.

In one preferred embodiment of the process of the invention, incorporated parts, where appropriate preassembled, for example lines, valves, pumps, filters, etc., are introduced into one or, where appropriate, even both half shells after step d) of the process.

For the purposes of the present invention, "plastic parison" is an extruded and preferably tubular preform which comes from the extrusion or coextrusion plant and retains melt heat, made from at least one, where appropriate two or more, layers of plastic. "Semifinished products" are the planar-surface structures produced by cutting the parison open, these then being molded, i.e. provided with a prescribed three-dimensional spatial structure open on one side, in blow molding molds and/or thermoforming molds. According to the invention, "half shells" are the shell-type structures which are formed by molding the semifinished products and which are then bonded to give hollow plastic articles.

It has been found that the process of the invention eliminates the disadvantages of the known processes of the prior art for producing hollow plastic articles. The use according to the invention of a intermediate frame or of a plate insert, and the opening and closing of the mold halves at various closure points, permits subdivision of the process previously known from DE 100 42 121 into functional steps, and this substantially facilitates incorporation of components into the interior of the hollow article, and permits a decisive improvement in the quality of the hollow articles. The process of the invention also permits problem-free incorporation of relatively large components in the interior of the hollow article, substantially without contact with the unmolded semifinished product.

The principle of the process of the invention for producing hollow plastic articles is that a plastic parison produced on a blow molding plant or coextrusion blow molding plant is cut open in an axial direction and the resultant molten, planar-surface semifinished sheets are introduced into two mold halves, and a removable intermediate frame separates these along the peripheral edge on closing of the mold, so that there is no substantial contact between the two semifinished plastic products. Use of the intermediate frame (FIG. 5) permits the two half shells to be fully molded, substantially independently of one another, in their respective mold halves, and the half shells can then be bonded to one another without removing them from the molds, after removal of the intermediate frame. This method can even introduce large incorporated parts, and also permits the half shells then to be welded to one another, for example, "while still hot", i.e. substantially without any need to reheat the entire half shells.

Figure 5:
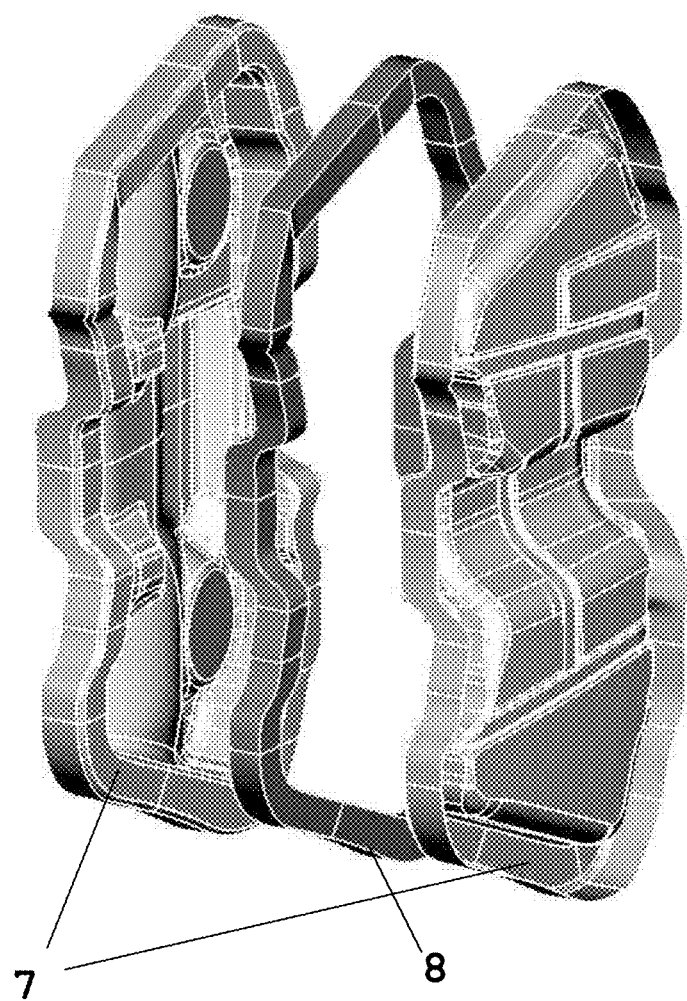
FIG. 5 illustrates an intermediate frame (8) between two half shells (7).

The design of the intermediate frame of the invention may also be that of a plate insert which substantially provides complete filling of the area between the two mold halves. For the purposes of this invention, therefore, a intermediate frame can always be a frame in the form of a plate. The intermediate frame or plate insert may be of single-part or multi-part design, and its shape has to adapt to the edge profile of the mold. It will therefore have curvature as required by the mold parting. Even though the parting surface may be complex, the selection of the contact surface for the frame may be such as to maximize the simplicity of the 3D profile (FIG. 5). If use is made of divided, multipart intermediate frames or, respectively, plate inserts, the parts are preferably independent of one another, or else movably coupled to one another.

The multistage process of the invention first closes the mold halves onto the intermediate frame in such a way that between each mold half and the frame there is a parison which has previously undergone division into two parts, but the parisons or semifinished products do not come into direct contact with one another. After molding of the semifinished products in the mold halves in a first step, the mold is opened and the intermediate frame is removed. At this juncture, there is full access to the inside of the subsequent hollow article, and it is therefore now possible to attach even large incorporated parts and position them precisely.

In a second step, a further closure movement then provides the final closing of the mold halves together, so that the semifinished products come into direct contact with one another and can then be bonded or welded. The term multistage is therefore used for the process described. In the two stages described, the displacement at which the mold is regarded as closed differs by the thickness of the intermediate frame.

The removal of the intermediate frame from the space between the mold halves may take place by translation or rotation, and a suitable robot may also be used for this purpose.

FIG. 1 shows a displacement/time diagram for the process of the invention. The molding cycle for the planar-surface parts begins with an open mold at the juncture $t_0$. Once the semifinished products have been placed in the mold halves, these are closed onto the intermediate frame or plate insert, and then during the period T1 the two half shells are shaped by blowing and/or thermoforming from the inside. The mold is then reopened at the end of this first stage of the process. During the period T2 there is now open access to the inside of the two half shells, providing the opportunity to position incorporated parts, for example, or coat the insides of the half shells. The intermediate frame is removed at the same time. The mold halves, this time without intermediate frame, are then closed together, whereupon the semifinished products are bonded or welded together. During the period T3, with the mold closed, a second stage of the process now uses blowing and, where appropriate, thermoforming to provide substantially complete shaping and cooling of the hollow article formed from the welded half shells. The mold is then reopened, and during the period T4 the hollow article is removed from the mold and the intermediate frame is reinserted, permitting recommencement of the cycle from the start.

The process of the invention permits completely free control of the nature of the half-shell-molding procedure by varying the process parameters in the first step (=stage 1), the closure of the mold with intermediate frameed, and in the 2nd step (=stage 2), closing without frame. This becomes possible because the periods T1-T4 are variable and can be freely selected in accordance with the respective requirements.

For example, if the time selected for stage 1 (T1) is longer than the second closure time without intermediate frame T3, the result is substantially molding by thermoforming. In the reverse case, if the second closure time T3 is longer, the hollow article is formed substantially by blow molding. Between these, it is possible to set any of the intervening levels for the ratio of the molding methods to one another, i.e. any desired single- or multistage combinations of thermoforming procedures and blow molding procedures.

If the setting of the process parameters is such that the magnitude of stage 1 is approximately that of the entire cycle time, the process corresponds to the production of thermoformed half shells which are individually removed in order to be subjected to completion subsequently. A moderate level of the ratio of stage 1 to stage 2—this level being dependent on the final product, inter alia—results in moldings by what may be called the EVBM (extrusion vacuum blow molding) process. The duration (T1) selected for stage 1 is such that the half shells can retain their shape, for example to allow incorporation of parts in the period T2, but at the same time the plastic is sufficiently hot to be welded during the second closure time T3. One way of improving shape retention is to apply a vacuum between the mold and the plastic, for example via suitable holes through the mold extending to the cavity. In contrast, if the duration of the first stage of the process (closing with frame) is shortened so greatly that it approaches zero, the process corresponds to the known blow molding process.

This variability of the process of the invention permits precise individual adaptation of the molding steps to the structural requirements of the molds and of the hollow article to be produced.

In addition, the blow molding and thermoforming steps can be selected as appropriate for the rheology of the respective plastics used, so as to allow the semifinished product to fit into the mold halves in an ideal manner and with consistent thickness.

Another particular advantage is that, in the process of the invention, when the mold is opened to remove the intermediate frame the two half shells are fully accessible, considerably facilitating the incorporation of components in the interior of the container. Because the semifinished products or half shells remain in the mold halves here, appropriate temperature-control of the mold and of the intermediate frame/plate insert can avoid any excessive cooling of the plastic, particularly at the subsequent inside of the hollow article, thus permitting direct welding of incorporated parts to the plastic which retains melt heat and ensuring that the half shells are still sufficiently hot to be welded to one another directly in the subsequent step.

The production of the planar-surface parts by way of a blow molding plant also permits accurate and reproducible wall-thickness control and high design freedom, due to the high flexibility of the molding steps. When a coextrusion blow molding plant is used, layers made from barrier polymers can be integrated into the semifinished product. If a single-layer semifinished product is manufactured on a blow molding plant, barrier layers can be employed subsequently, for example by fluorination or painting. The coating procedures may advantageously take place on the fully accessible half shells after opening of the mold, prior to or after the attachment of incorporated parts.

The intermediate frame of the invention fulfils a number of functions. The main function is to hold or secure the peripheral edge of the semifinished product in the mold half during the molding procedure. The frame also serves as a surface which applies pressure during pinch-off of the semifinished product by way of the pinch-off edge of the mold. The functions of securing and pinch-off are decisively affected by the geometry and design of the edge regions, both of the intermediate frame and of the mold. In the invention, it is preferable for the edges of the mold to have a differentiated design in order to provide controlled contact between the semifinished product and the intermediate frame. The manner of sealing-off of the semifinished product is such as to permit at least some degree of blowing of the semifinished product before the first molding stage has ended, without hindering the subsequent formation of a clean pinch-off weld.

In particularly preferred embodiments of the invention, the intermediate frame or plate insert can assume other functions, for example the controlled introduction or dissipation of compressed air via appropriate holes. This permits the function of flushing or ventilation to be exercised. It is also possible for additional functional units, including moveable functional units, such as stamps or jaws, to be arranged on, or integrated on or in, the frame. The intermediate frame may also be used as a support for components to be introduced.

To support the functions of the intermediate frame, this may have equipment for the cooling or heating of at least one subregion of the frame. The temperature control may provide differences as a function of time and/or of location, and certain regions of the frame/plate may therefore, where appropriate, be capable of control to different temperatures during a process cycle. An example of a method for temperature control is to pass a suitable cooling medium or heating medium through channels. It is also possible to use electrical cartridge heaters or thermocouples. Particular preference is given to precise temperature control, preferably heating of the pinch-off edge of the mold, in order to achieve greater homogeneity and freedom from stress at the pinch-off edge.

Since partial local cooling of the edge by which the semifinished product is secured occurs during the thermoforming process, stresses can develop in the plastic during the pinch-off procedure, and can adversely affect mechanical performance and pinch-off weld quality. Another result of the cooling is that reheating has to be used, where appropriate, in order to obtain the welding temperature needed for the subsequent welding of the half shells to give the finished hollow article. This likewise brings about stresses in the plastic, which result in development of notching and points of weakness in the finished hollow article. For these reasons, in one preferred embodiment of the present invention the edge region of the half shell is locally heated or locally temperature-controlled. The temperature control of the plate insert in the region in contact with the pinch-off edge of the mold preferably takes place on both sides of the edge of the plate, or else may be present only on one side.

The present invention also provides a hollow plastic article which can be produced by the process described above. The invention provides preferred use of the hollow plastic articles prepared by the process of the invention as plastic fuel tanks in motor vehicles, or else as a gasoline canister, a plastic tank for storage or transport of heating oil, diesel, or the like, or a transport container on a utility vehicle, for example for crop sprays, or a solvent container, plastic bottle, or the like.

Another advantage of the production process of the present invention is that, prior to the bonding of the molded semifinished products, it is possible without difficulty where appropriate to attach incorporated parts, such as components of a fuel system, to the inside of the half shells. The invention therefore provides for incorporated parts, such as ventilation lines for pressure equilibration within the tank, fuel lines for equilibration of liquids within the tank, valves, anti-surge cups, or pump-related and/or tank sensor modules, for example, to be attached to the inside of the half shells before welding the thermoformed semifinished products.

The semifinished products may be bonded by adhesive bonding with suitable adhesives or by hot welding, or by a combination of these two. Preference is given to welding. The welding of the semifinished products preferably takes place "while still hot", i.e. the edges of the half shells which still retain melt heat after molding in stage 1 and removal of the intermediate frame are brought directly into contact with one another by closing the mold halves in stage 2, and the half shells are directly welded to one another, with flash pinch-off.

In the process of the invention it is advantageous for there to be no, or only slight, cooling prior to the bonding of the two semifinished products. The nature of the process means that cooling mainly takes place externally. The insides of the semifinished products, the edges of which are brought into contact and welded in stage 2 during period T3, generally retain melt heat, and therefore remain weldable, for a prolonged period. In one particularly preferred embodiment of the process, no additional heating steps or cooling steps are needed for producing the hollow plastic article from the (co) extruded tubular parison which retains melt heat.

According to the invention, this may be achieved by providing equipment for cooling or heating in the intermediate frame, as described above.

Another substantial advantage of the process of the invention is that precise control is possible of the wall thickness of the plastic parison on the coextrusion blow molding plant used. The precise control of the wall thickness of the parison on the coextrusion blow molding plant gives a significant improvement in wall-thickness control in the subsequent thermoforming process. The diameter or circumference of the plastic parison is set by way of the diameter of the parison die, and has to be adapted to the requirements of the subsequent steps of the process. The wall thickness of the plastic parison may be controlled in an axial direction during the extrusion process with the aid of the variable die gap. Radial wall thickness control may also be implemented by using profiled die/mandrel pairs or flexible die rings which can be deformed using suitable actuators (partial wall-thickness control).

During or after discharge of the molten plastic from the die to give a desired length which has to be adapted, where appropriate, to the requirements of the subsequent steps of the process and to the geometry of the finished part, the parison is cut open to give at least one, preferably two, or else more, for example three or four, planar-surface parts. In one preferred embodiment, the cutting of the plastic parison takes place prior to separation from the die, i.e. before the extrusion process is complete, or immediately afterward.

In another particularly preferred embodiment, the plastic parison is extended perpendicularly to the direction of extrusion with the aid of a stretching device prior to cutting. If only one side of the tubular parison is cut open, the result is a large-surface-area semifinished product which can be placed over a thermoforming mold with two chambers for the upper shell and lower shell in such a way that two half shells are produced and are then separated from one another and welded. It is preferable for two sides of the tubular parison to be cut open so that two planar-surface parts are obtained, each of which is molded into a thermoforming mold. The invention also provides for the parison to be cut open to give more than two parts and, where appropriate, for the finished part to be manufactured from more than two subshells.

The resultant plastic parts are then further processed by a thermoforming process to give semifinished products of half-shell type. Existing coextrusion blow molding plants may also be used advantageously for the process of the invention. It is merely necessary for the blow molding plants to be supplemented by appropriate cutting units, preferably robots, and thermoforming units, and it is in principle also possible here to use the existing clamping units of the blow molding plants for the thermoforming, completion, and welding processes.

It has been found that the use of conventional cutting devices used for separating plastic webs, for example conventional steel blades, has serious disadvantages. In particular, it has been found that the plastic melt often adheres to the equipment or the blade. This adhesion leads to undesirable deformation of the parison and of the molten semifinished sheets (known as curtains) obtained after the separation procedure. It has also been found that in many instances, in particular at the start of the extrusion procedure, the pressure of the upstream melt is not sufficient for the desired cutting procedure to be carried out. The resistance exerted by the cutting device or the knife on the parison is frequently so great as to result in marked warping of the parison, in particular at the start of the extrusion process, i.e. at the start of discharge of the tube from the die. This leads to considerable deformation of the resultant cut edges, and also of the curtains themselves.

In one particularly preferred embodiment of the present invention, the manner of cutting the plastic parison is therefore as follows:

The cutting device for cutting the annular tube into one or more molten semifinished sheets (known as curtains) may in principle have any desired knife designs or knife geometries. For example, the cutting device may encompass sharp-edged cutting elements, which, where appropriate, may also be exchangeable. Besides sharp-edged equipment, it is also possible to use equipment which is edgeless or rectangular or bar-shaped and which functions as a knife or separator. However, it has proven particularly advantageous to use a triangular knife which cuts the parison open as it is discharged, to give two halves.

The nature of the surface of the cutting device or of the knife or parts thereof may be smooth or else grooved. Depending on the requirement, part or all of the cutting device or of the knife itself may be heated or cooled.

It will be advantageous for the knife or knives used, which is/are preferably triangular, to be given a coating which prevents adhesion of the hot plastic melt. Suitable coatings encompass polytetrafluoro-ethylene (PTFE), for example, or other fluorinated hydrocarbons.

The abovementioned problems can also be countered by way of the arrangement of the cutting device or of the knife or knives. In principle, the arrangement of the knife or of the cutting device may be at the mandrel and/or at the die of the extrusion equipment. In some instances it has proved advantageous to cut the parison up immediately on discharge from the die. The arrangement of the cutting device or of the knives may be either horizontal or vertical.

As an alternative to installation of a cutting device at the mandrel and/or at the die, the plastic melt may be separated with the aid of flow dividers arranged in the interior of the blow molding head. These flow dividers may be used simply as displacers which create a point of weakness in the parison tube with severity sufficient for the parison to break apart spontaneously or with slight assistance.

The second possibility is a procedure similar to the process for producing a window strip, in which a transparent plastic is fed in by way of the flow dividers. The plastic used for the purpose of separating the tube is incompatible with the plastics of the parison. Due to the incompatibility, the "separator strip" thus introduced can be pulled away without any great effort, whereupon the remaining tube sections (curtains) are then used as planar-surface parts in the process of the invention. Examples of suitable incompatible polymers are polyamides, polystyrene, and, where appropriate, also polypropylene.

Another way of separating the tube or the parison uses a glowing wire. The abovementioned glowing wire may either be fixed or movable. Lasers may also be used to separate the melt or the parison into curtains.

The abovementioned cutting devices, including knives, flow dividers, glowing wire, and lasers, may have a rigid arrangement, or else oscillate. They may also pass over the melt rapidly in order to avoid undesirable displacement of material. As an alternative, the abovementioned cutting devices may be of movable design.

One way of considerably reducing the resistance produced when the parison encounters the cutting device is to give the cylindrical parison a "point of weakness". In this connection, it has been found that the use of polymers incompatible with the base polymer of the parison permits very simple separation. Incompatibility in this connection means that no welding of the base polymer to the coextruded polymer occurs. Appropriate polymers are mentioned above.

In particular in the case of parisons with particularly high wall thickness and/or parisons made from particularly high-molecular-weight material, it has proved advantageous to provide the cutting device with a means of drive: if a parison with relatively high wall thickness is guided over a cutting device, warping and creasing can be produced (FIG. 3) at the resultant cut edges, since the resistance exerted by the cutting device or the knife on the parison is particularly great during the separation of parisons with high wall thickness.

It has been found that the abovementioned problems can be overcome by equipping a cutting device described above with a drive system which draws off or transports the parison and/or the resultant curtains. The draw-off mechanism causes the parison or the curtains to be pulled over the cutting device, thus compensating for the abovementioned resistance exerted, or forces arising, on the parison due to the cutting device. Using this method it is possible to process parisons with thin and thick wall layers made from high- to (inclusive) low-molecular-weight and/or from high- to (inclusive) low-density material.

One particularly preferred draw-off system encompasses one or more roller-type draw-off units per semifinished product, for example driven rollers, and particularly preferably pneumatic floating rollers. The driven units or driven rollers exert tension on the parison or the curtains. This tension acts together with the compression generated by the extrusion process to guide the parison consistently in the desired manner over the cutting device.

The use of driven rollers or rolls has the additional advantage that the parison section is immediately distanced from the cutting knife after separation of the parison, thus avoiding any adhesion. In one particularly preferred embodiment, the driven rollers are integrated within the cutting device, preferably a triangular cutting knife. As an alternative, the driven rollers may also be attached separately, i.e. outside the cutting device.

It is also preferable that the driven units have a profile or groove or a suitable coating, in order to ensure sufficient friction or, respectively, continuous transporting of the thermoplastic composition.

The velocity of the parison or parison section relative to that of the driven unit may be from 0 to a positive difference in favor of the velocity of the driven unit. A positive difference in favor of the driven unit is preferred.

In another preferred embodiment, the equipment for guiding the parison or the parison sections (curtains) also comprises guide rollers. These guide rollers may, where appropriate, also be driven. An example of the use of these guide rollers is to control the distance between the parison sections obtained, or else to deform, and in particular flatten, the parison sections. The cutting or guiding devices have guide rollers as well as the abovementioned driven rollers.

One particularly preferred drive system encompasses roller-type drive units, for example driven rollers, and particularly preferably pneumatic floating rollers. The driven units or driven rollers exert tension on the parison or the curtains. This tension acts together with the compression generated by the extrusion process to guide the parison consistently in the desired manner over the cutting device.

The use of driven rollers or rolls has the additional advantage that the parison section is immediately distanced from the cutting knife after separation of the parison, thus avoiding any adhesion. In one particularly preferred embodiment, the driven rollers are integrated within the cutting device, preferably a triangular cutting knife. As an alternative, the driven rollers may also be attached separately, i.e. outside the cutting device.

The invention provides for the use of robots for individual operations in the process, in particular for the separation, transport, and cutting of the plastic parison, and also the insertion of incorporated parts into the hollow article.

The hollow plastic articles produced by the process of the invention preferably have a structure of two or more layers, since the plastic material is subject to high stress levels and requirements are stringent, for example with respect to barrier action.

The hollow plastic articles of the invention preferably have a structure of at least two layers. These layers always involve a supporting base layer which usually forms the inner surface of the hollow article. This layer is therefore of decisive importance for the leakproof nature of the container and its mechanical stability.

In one particular embodiment, the plastic parison produced has at least one layer made from polymeric material, preferably selected from the group consisting of polyethylene, polypropylene, polyvinyl chloride, polyamide, polyketone, polyester, and mixtures of these. The plastic parison produced preferably has at least one layer made from polyethylene, in particular polyethylene with a density of 0.93 to 0.97 g/cm$^3$.

In another preferred embodiment, the plastic parison has a structure composed of two or more layers, preferably encompassing base layer, regrind layer, adhesion-promoter layer, and/or barrier layer.

The layer thickness distribution within the finished part and therefore the parison depends on the number of layers. Given below is the layer thickness distribution in a plastic parison produced by the process of the invention and having a structure composed of six layers. A particularly preferred embodiment produces a plastic parison and, respectively, a hollow plastic article with a structure composed of six layers, encompassing, from the outside to the inside:

a layer made from HDPE with thickness from 5 to 30%,
a regrind layer with thickness from 10 to 82%,
an adhesion-promoter layer with thickness from 1 to 5%,
a barrier layer with thickness from 1 to 10%,
an adhesion-promoter layer with thickness from 1 to 5%,
a layer made from HDPE with thickness from 10 to 40%,
 based in each case on the total thickness of the container wall.

Suitable base materials encompass high-density polyethylene (HDPE) with a density of from 0.940 to 0.960 $g/cm^3$, in particular from 0.943 to 0.955 $g/cm^3$, and particularly preferably from 0.943 to 0.950 $g/cm^3$. The melt flow ratio of polyethylene materials suitable for the invention is from 1.5 to 20 g/10 min (MFR (190° C./21.6 kg)), in particular from 2 to 10 g/min, and particularly preferably from 3 to 8 g/10 min. Other abovementioned polymeric materials are, of course, also suitable as supporting base material.

Suitable barrier materials encompass ethylene-vinyl alcohol copolymer (EVOH), polyamide, and also other barrier polymers, such as polyesters, in particular polybutylene terephthalate, fluoropolymers, such as polyvinylidene fluoride, ethylene-tetrafluoroethylene copolymer (ETFE), tetrafluoroethylene-hexafluoro-propylene-vinylidene fluoride copolymer (THV), and also liquid-crystalline polymers (LCPs). Other suitable materials are mixtures of the abovementioned barrier materials with nanoparticles. For the purposes of the present invention, nanoparticles are inorganic phyllosilicates whose atomic layers have been parted and thus loosened by intercalated organic molecules. The atomic layers can be separated by incorporation into polymeric materials, bringing about extremely fine distribution of the particles. The surface of the dispersed particles brings about extreme lengthening of the diffusion path for any permeating molecule, the result being reduced permeation.

Adhesion promoters suitable for the invention encompass polar-modified polyethylenes (HDPE or LLDPE and LDPE). The polar modification is usually a result of graft copolymerization with polar molecules having C=C double bonds, for example fumaric acid, maleic acid, or maleic anhydride. The grafted polyethylenes may also be chemically modified in downstream reactions, for example by introducing amino groups. Other materials suitable in principle as adhesion promoters are copolymers of ethylene with vinyl acetate, acrylic acid, or its esters.

The layer which may be called the regrind layer is preferably produced from what is known as flash, for example that produced during production of the hollow plastic articles and taking the form of residual materials or of production residues.

Further embodiments of the invention provide that the half shells or the hollow plastic article prior to and, respectively, after the welding of the two thermoformed semifinished products are/is given an additional permeation-reducing coating.

The permeation-reducing coating may be obtained on the plastic containers by direct fluorination, painting, or plasma polymeriz-ation, for example.

Express reference is made to the fact that the following description of the process of the invention merely covers examples of the possible embodiments. The invention also provides other embodiments which likewise embody the principle of the process of the invention.

In the first step of the process of the invention, a plastic parison is first produced, for example using a 6-layer coextrusion blow molding plant as produced and marketed by the company Krupp Kautex Maschinenbau. The coextrusion process gives a tubular parison composed of six layers. The layer structure of the parison corresponds to the structure described above (from the outside to the inside: HDPE, regrind, adhesion-promoter, barrier polymer, adhesion-promoter, HDPE). The layer thickness distribution of the parison is likewise within the ranges given above.

During the coextrusion process, the parison wall thickness is adapted to the geometry of the finished part in such a way as to give maximum consistency of wall thickness distribution in the finished part, with no thin areas. The parison wall thickness here is controlled by a suitable program which controls the die gap as a function of time (WDS), and, where appropriate, also by radial die gap control (PWDS). The wall thickness distribution depends on the requirements placed upon the mechanical performance of the material, and also in the case of plastic fuel tanks on the required fire performance. The diameter or circumference of the parison tube is adapted to the requirements of the mold and can be set without difficulty by way of the selection of the diameter of the die.

The plastic parison is extruded to the length required for the respective mold. The invention provides that the parison can be extruded by way of a suitable stretching device, which in the simplest case is composed of two bars mounted vertically and capable of being moved away from one another hydraulically, for example. If the two bars arranged parallel or else at an angle to one another and located in the interior of the parison tube are moved away from one another, the melt over the entire length of the parison tube experiences extension transversely to the direction of extrusion. The stretching device described above may, of course, also be of multipart design, permitting the parison tube to be subjected to various controlled degrees of extension or spreading in an axial direction. The use of a stretching device to shape the material provides not only a method of controlled preshaping of the coextruded tube but also a method of controlling the wall thickness of the parison.

The resultant plastic parison is separated below the die of the extrusion head. The molten parison stretched and held in the stretching device is then swung out of the parison extrusion area so that in the next operation it can be cut open along at least two lines matched to the requirements of the subsequent steps of the process and of the finished part. To this end, holding devices are brought up to both sides of the plastic parison. These are capable of securing and positioning the halves of the parison which are produced in the cutting process. Examples of suitable holding devices are suction heads. The separation and transporting of melt tubes is a step known in the prior art and is described in detail in EP 0 653 286, for example. The partitioning of the plastic parison in an axial direction preferably takes place using robots, which permit three-dimensional control of the cutting tools. In this way it is possible for the planar-surface shape of the semifinished product to be adapted to the edge curvature of the thermoforming mold, and this makes it possible to minimize the proportion of flash produced. If desired, it is also possible for the melt tube to be cut up in an axial direction before completion of the extrusion process, or else immediately after, prior to separation from the die. If the cutting-up process takes place during the extrusion process, the planar-surface part may itself be stretched perpendicularly to the direction of extrusion.

The next step then brings the resultant planar-surface parts, which mostly have the shape of sheets, to the two thermoforming mold halves, preferably located opposite one another. Robots may also carry out this function. Where appropriate, the thermoforming mold halves have different shapes, for the upper and, respectively, lower portion of the hollow plastic article to be manufactured. In a first step, the two mold halves are closed onto the intermediate frame, each mold half closing onto one side of the frame. The design of the intermediate frame is such that contact of the two semifinished products is prevented. Subatmospheric pressure is applied within the mold halves, and/or compressed air is injected from the center of the closed mold, thus sucking the molten semifinished products into the mold or, respectively, pressing these against the mold by virtue of the compressed air, and use of an appropriate pressure-time profile here can further optimize the multiaxial extension of the melt and thus also the wall thickness distribution in the half shells to be manufactured. It is also possible for the thermoforming steps and blow molding steps to be carried out in succession or simultaneously in any desired sequence and combination.

After molding of the semifinished products into the mold halves, the mold is opened and the intermediate frame removed. Where appropriate, incorporated parts are then assembled into the half shells, and/or the insides of the half shells are coated. During manufacture of a plastic fuel tank it is possible, for example, to insert ventilation lines for pressure equilibration within the tank, fuel lines for equilibration of liquids within the tank, valves, anti-surge cups, or pump-related and/or tank sensor modules for refuelling into the tank half shells, and to weld these to the inner surface, which retains the melt heat. For this process too, it is preferable to use robots. In the final step of manufacture, the two half shells still located in the molds are brought together and are bonded to one another by pressing the two molds together, by again closing the mold, this time with no intermediate frame. Here, those portions of the two semifinished products which lie on the face sides of the mold halves are brought into contact with one another and preferably welded. The design of the molds and of their closing movements are such that when the half shells are pressed together material can flow into suitable chambers during the welding procedure, so that the geometry of the weld can be adapted to the requirements placed upon component strength and resistance to fuel permeation. After the jointing process, and where appropriate after further molding via blow molding or thermoforming, the tank is demolded in accordance with the cooling times required by the process technology.

Figure 2A:
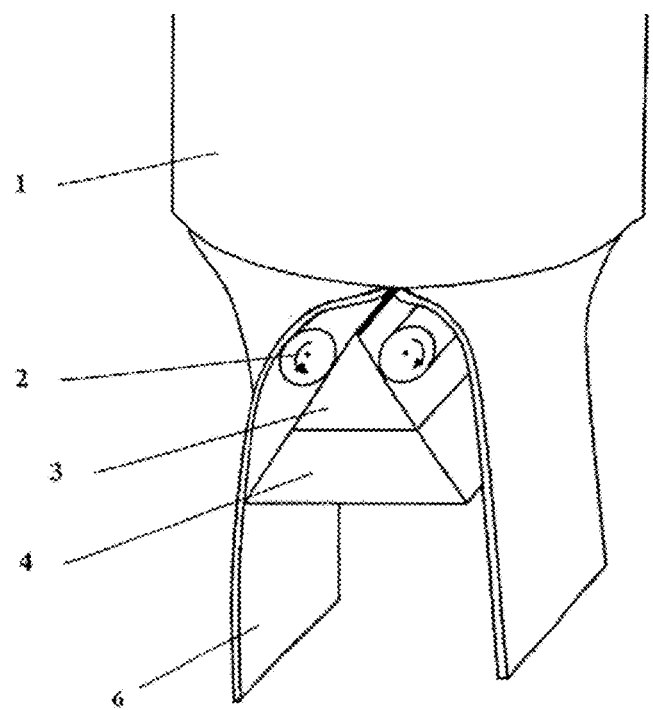
FIG. 2A is a diagram of a device for partitioning a plastic parison.

FIG. 2A is a diagram of the device of the invention for partitioning a plastic parison. The plastic parison is in the form of a tube when discharged from the die of the extrusion equipment (1). An optionally coolable body (3) with triangular cross section, arranged transversely to the direction of extrusion, functions as cutting device or means of partitioning the plastic parison. The equipment also encompasses a heatable holder (4) on which the cutting device has been attached. Two pneumatically driven rolls (2) arranged in the immediate vicinity of the cutting device function as an inventive means of drive. Installation in the immediate vicinity of the body (3) has the advantage that the two resultant parison sections (6) are distanced from the cutting device immediately after separation of the parison, thus avoiding any adhesion of the semifinished sheets to the device. The tension exerted by the driven rolls (2) guides the plastic parison consistently over the cutting device, so that the resultant semifinished sheets have no, or comparatively very low levels of, creasing or irregularity, in particular at the margins, i.e. at the cut edges.

Figure 2B:
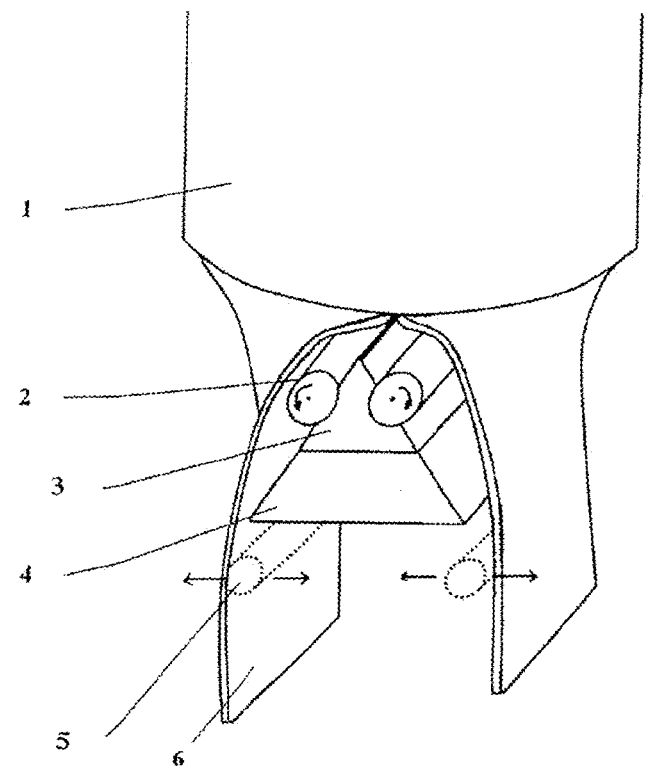
FIG. 2B is a diagram of a device for partitioning a plastic parison with guide rollers(5).

FIG. 2B is a diagram of another device of the invention for partitioning a plastic parison. The device shown in FIG. 2 differs from the device of FIG. 1 merely by way of two guide rollers (5) additionally installed. These guide rollers eliminate undesired contact between the semifinished products (6) after the separation procedure, and also give the desired free space for components and devices to be introduced. The guide rollers (5) may be moved transversely to the direction of extrusion. The movability of the guide rollers transversely to the direction of extrusion permits controlled setting of the distance between the semifinished products obtained. The driven rolls (2) in the device of FIG. 2 have been set into or integrated into the cutting device (3).

Figure 3:
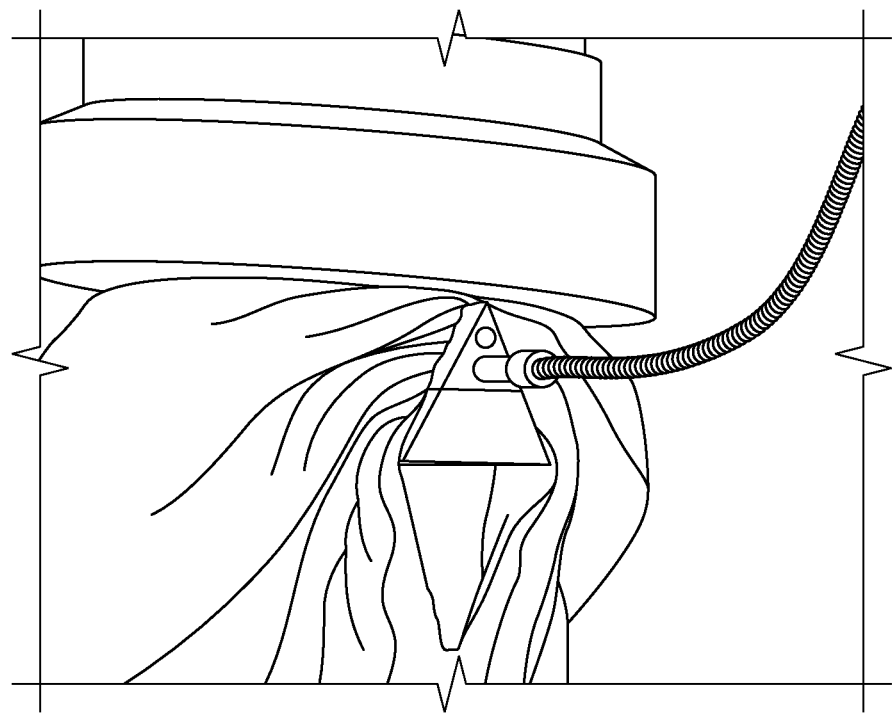
FIG. 3 illustrates deformation in parisons prepared by processes not according to the invention.

FIG. 3 depicts the distortion of the parison when using devices not according to the invention (without means of drive). This gives considerable deformation of the resultant cut edges and also of the semifinished products themselves.

Figure 4:
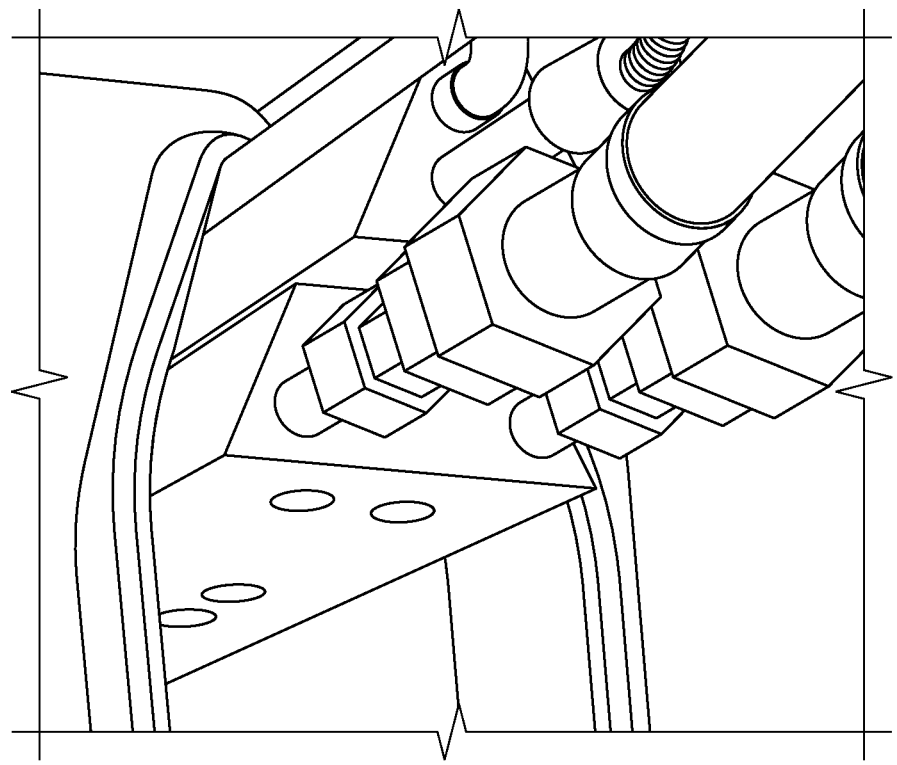
FIG. 4 illustrates a device for partitioning parisons, and the resultant partitioned parisons or semifinished sheets.

FIG. 4 depicts the device of the invention and the resultant partitioned parisons or resultant semifinished sheets. These have no creasing or irregularity, in particular at the margins, i.e. at the cut edges. The polymer processed was the same as in FIG. 3.

FIG. 5 illustrates a intermediate frame (8) between two half shells (7).

We claim:

1. A process for producing hollow plastic articles comprising the steps:
    a) producing a tubular plastic parison by means of extrusion or coextrusion;
    b) cutting open the tubular plastic parison with a cutting device to produce two planar-surface parts using pneumatically driven rollers arranged in the immediate vicinity of the cutting device for distancing the two planar-surface parts from the cutting device immediately after separation of the parison;
    c) molding the planar-surface parts in two mold halves to give half shells, where a removable intermediate frame separates the mold halves from one another at least along peripheral edges, wherein the planar-surface parts and half shells are not in contact with one another;
    d) opening the mold halves and removing the intermediate frame;
    e) closing the mold halves, wherein the half shells come into contact with one another along a peripheral rim; and
    f) bonding the half shells
wherein the driven rollers are integrated within the cutting device.

2. The process of claim 1 wherein the cutting device is a triangular cutting knife.

3. The process of claim 1 wherein after removal of the intermediate frame, incorporated parts are attached to the inside of at least one of the molded half shells.

4. The process of claim 3 wherein the incorporated parts are chosen from ventilation lines for pressure equilibration within a tank, fuel lines for equilibration of liquids within the tank, valves, anti-surge cups, pump-related sensor modules and tank sensor modules.

5. The process of claim 1 wherein the planar-surface parts are molded in the mold halves to give half shells by means of at least one of thermoforming and blow molding.

6. The process of claim 1 wherein the bonding of the half shells comprises at least one of adhesive bonding and welding.

7. The process of claim 5 wherein heat from thermoforming is used to weld the half shells.

8. The process of claim 1 further comprising molding of the hollow article by at least one of thermoforming and blow molding after bonding of the half shells.

9. The process of claim 1 wherein the intermediate frame comprises a plate insert which substantially provides complete filling of an area between the two mold halves.

10. The process of claim 1 wherein the intermediate frame comprises equipment for cooling or heating.

11. The process of claim 1 wherein the intermediate frame comprises equipment for controlled heating of the edges of the molded half shells.

12. The process of claim 1 wherein the intermediate frame comprises equipment for heating a pinch-off edge of at least one mold half.

13. The process of claim 9 wherein the intermediate frame or the plate insert is of single-part or multipart design.

14. The process of claim 1 which proceeds without additional heating steps or cooling steps.

15. The process of claim 1 wherein the cutting of the tubular plastic parison takes place before the extrusion process is complete.

16. The process of claim 1 wherein the plastic parison comprises at least one layer made from polymeric material.

17. The process of claim 1 wherein the plastic parison comprises a structure of at least two layers.

18. The process of claim 1 wherein the plastic parison comprises a structure of at least two layers wherein the at least two layers are arranged, from the outside to the inside:
   (1). a layer made from HDPE with thickness from 5 to 30%;
   (2). a regrind layer with thickness from 10 to 82%;
   (3). an adhesion-promoter layer with thickness from 1 to 5%;
   (4). a barrier layer with thickness from 1 to 10%;
   (5). an adhesion-promoter layer with thickness from 1 to 5%; and
   (6). a layer made from HDPE having a thickness from 10 to 40%, based in each case on a total thickness of the plastic article wall.

19. The process of claim 12 wherein the intermediate frame has equipment for heating a pinch-off edge of both mold halves.

20. The process of claim 16 wherein the polymeric material is selected from the group consisting of polyethylene, polypropylene, polyvinyl chloride, polyamide, polyketone, polyester, and mixtures thereof.

21. The process of claim 17 wherein the at least two layers comprise a base layer and at least one of a regrind layer, and adhesion-promoter layer and a barrier layer.

22. A process for producing hollow plastic articles, comprising the following steps:
   a). producing a tubular plastic parison by means of extrusion or coextrusion;
   b). cutting open the tubular plastic parison with a cutting device to produce two planar-surface parts using pneumatically driven rollers arranged in the immediate vicinity of the cutting device for distancing the two planar-surface parts from the cutting device immediately after separation of the parison;
   c). controlling the distance between the two planar-surface parts with guide rollers;
   d). molding the planar-surface parts in two mold halves to give half shells, where a removable intermediate frame separates the mold halves from one another at least along peripheral edges, wherein the planar-surface parts and half shells are not in contact with one another;
   e). opening the mold halves and removing the intermediate frame;
   f). closing the mold halves, wherein the half shells come into contact with one another along a peripheral rim; and
   g). bonding the half shells wherein the driven rollers are integrated within the cutting device.

* * * * *